(No Model.)
J. M. DAVIDSON.
OZONE GENERATOR.
No. 254,930. Patented Mar. 14, 1882.
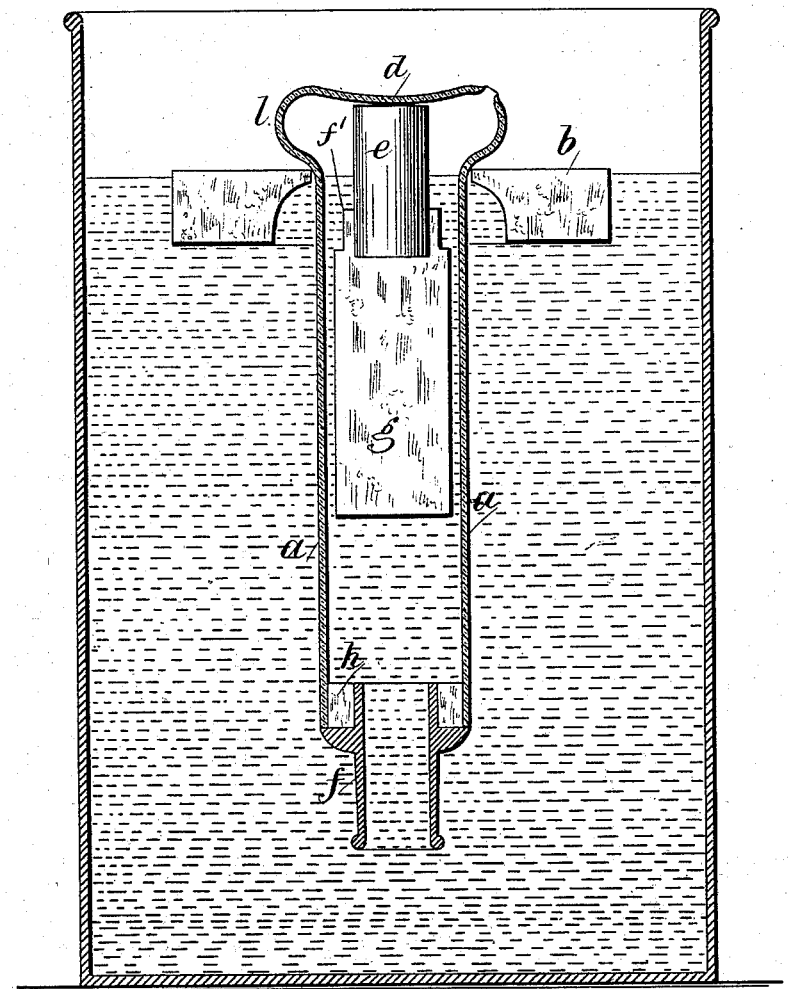
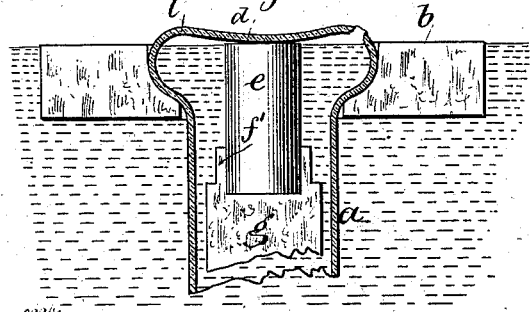
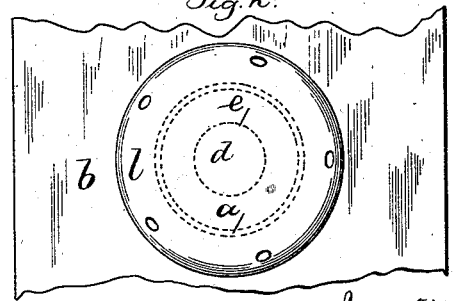

UNITED STATES PATENT OFFICE.

JOHN M. DAVIDSON, OF NEW YORK, N. Y.

OZONE-GENERATOR.

SPECIFICATION forming part of Letters Patent No. 254,930, dated March 14, 1882.

Application filed December 2, 1881. (No model.)

*To all whom it may concern:*

Be it known that I, JOHN M. DAVIDSON, of the city and State of New York, have invented an Improvement in Ozone-Generators, of which the following is a specification.

Ozone-generators have been made with a float to carry the phosphorus, and another float with a stop against which the phosphorus is pressed, so that a certain portion of the phosphorus is exposed to the action of the moist vapors for the production of ozone.

My invention is made for the purpose of insuring a more perfect presentation of the phosphorus to the action of the air and moisture, for simplifying the apparatus and lessening its cost, and for allowing the phosphorus to be entirely immersed when not required for use. I make use of a guide-tube that is maintained in a vertical position by the joint action of an annular float and a float that raises the phosphorus, and I use a removable weight to insure steadiness to the guide-tube.

In the drawings, Figure 1 is a vertical section of the apparatus. Fig. 2 is a plan of the same, and Fig. 3 is a partial section with the float reversed.

The guide-tube $a$ is preferably of glass; but it may be of other material. It is provided at its upper end with an annular displacer or float, $b$, that is sufficient, or nearly so, to cause the tube $a$ to assume and maintain a vertical position within the water in the vessel that forms the holder. This guide-tube $a$ is weighted at its lower end by glass or other material, $f$, introduced into an elastic stopper, $h$, that is inserted in the lower end of the tube $a$.

There is a stop or finger, $d$, at the top end of the guide-tube $a$, the same being formed of a cross-bar, or of a perforated bulb, $l$, and the stick of phosphorus, $e$, is held in a cup, $f'$, and raised by a float, $g$, so that its upper end is constantly pressed against the stop or finger $d$, and the floating power of the float $g$ is sufficient to lift the phosphorus, and also to partially raise the guide-tube and prevent it sinking in the water.

The float $b$ is recessed at its under surface around the opening for the guide-tube, so that when the float is reversed, as seen in Fig. 3, the guide-tube will sink down deeper in the water than it will when the float is in its normal position, as shown in Fig. 1, thereby allowing for the phosphorus being entirely immersed and protected from atmospheric action, so as to stop the generation of ozone.

By my improvement the guide-tube is kept in a vertical position, the flat float retains the phosphorus-holder in a nearly central position in the liquid, the perforated cap at the top of the glass holder prevents the atmosphere coming into contact with the phosphorus to such an extent as to cause its ignition, and the generation of ozone can be carried on or stopped at pleasure by simply reversing the float.

There is an opening for the liquid to pass freely into and out of the guide-tube. This opening may be in the side of the tube; but it is preferably through the stopper, as shown.

I claim as my invention—

1. The combination, in an ozone-generator, of the guide-tube $a$, float $b$, stop-finger $d$, phosphorus-cup $f'$, and float $g$ within the guide-tube, substantially as set forth.

2. The combination, in an ozone-generator, of the guide-tube $a$, float $b$, stop $d$, float $g$, phosphorus-cup $f'$, and removable weighted stopper $h$, substantially as set forth.

3. The combination, in an ozone-generator, of a guide-tube, a removable weighted stopper at the lower end of a float, a phosphorus-holder, and perforated cap at the upper end of the guide-tube, forming also a stop for the end of the phosphorus, substantially as set forth.

4. The combination, with the guide-tube, phosphorus-holder, and its float, of a reversible float for the guide-tube, having one surface recessed, so that the phosphorus may be entirely immersed to stop the generation of ozone, substantially as set forth.

Signed by me this 29th day of November, A. D. 1881.

JOHN M. DAVIDSON.

Witnesses:
GEO. T. PINCKNEY,
CHAS. H. SMITH.